Nov. 20, 1923. 1,474,702
G. W. ATKINSON
PROCESS AND MEANS FOR PLUCKING POULTRY
Filed Feb. 17, 1923    2 Sheets-Sheet 1
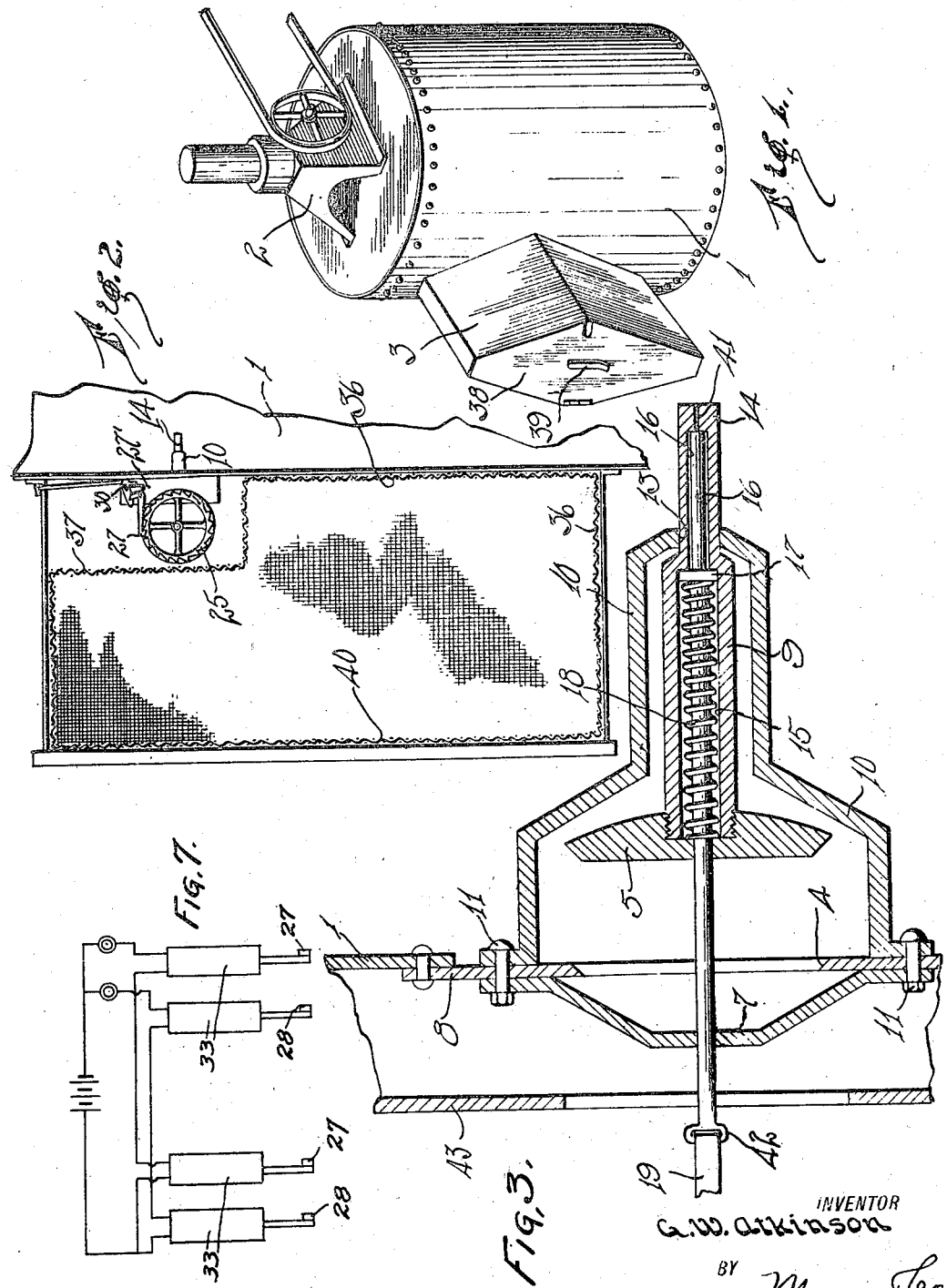

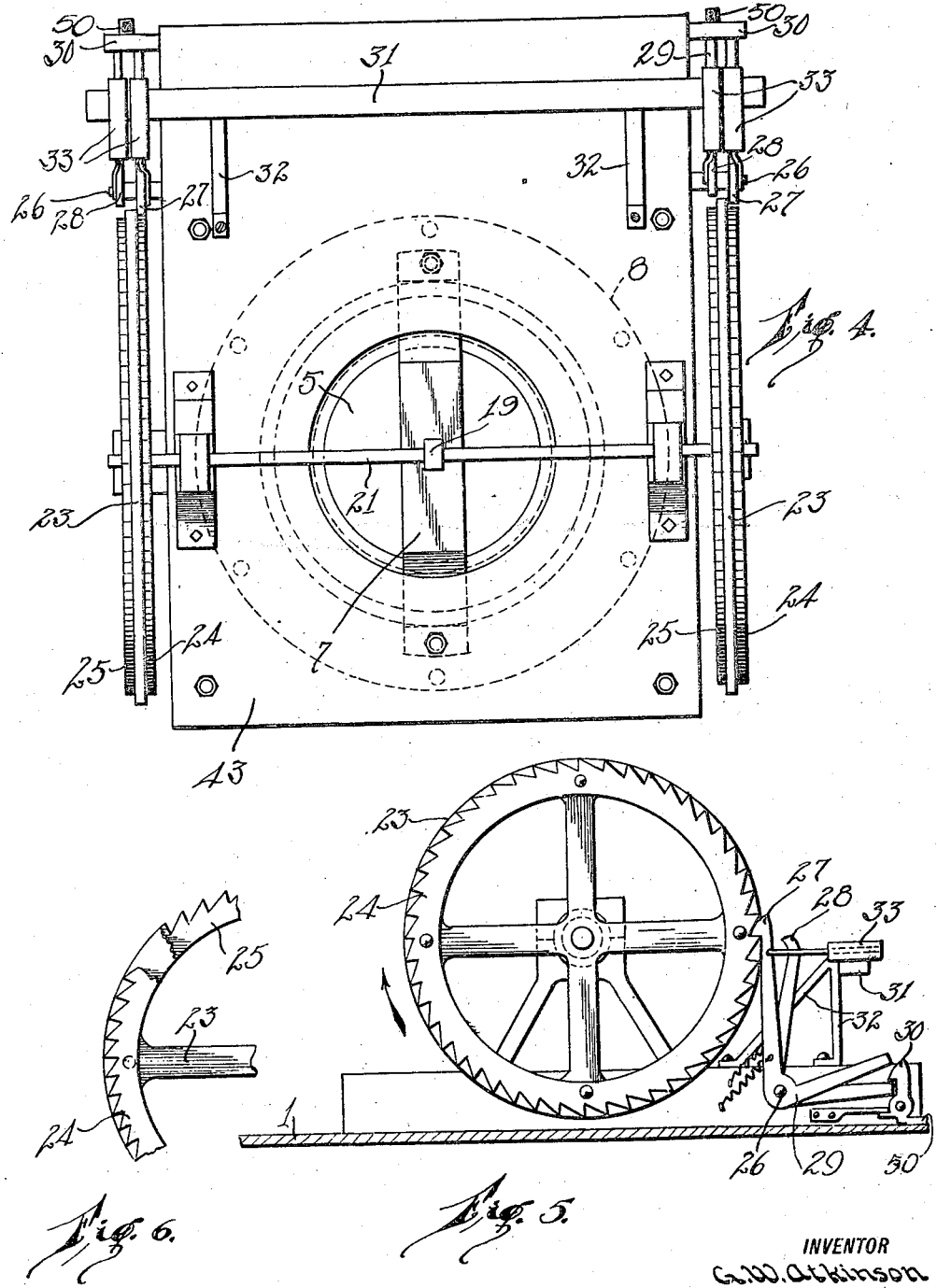

Patented Nov. 20, 1923.

1,474,702

UNITED STATES PATENT OFFICE.

GEORGE W. ATKINSON, OF SAMUELS, IDAHO.

PROCESS AND MEANS FOR PLUCKING POULTRY.

Application filed February 17, 1923. Serial No. 619,699.

*To all whom it may concern:*

Be it known that I, GEORGE W. ATKINSON, a subject of the King of England, and a resident of Samuels, in the county of Bonner and State of Idaho, have invented a new and useful Improvement in Processes and Means for Plucking Poultry, of which the following is a full, clear, and exact description.

My invention relates to improvements in a process and means for plucking poultry, and it consists in the steps hereinafter described, and in the combinations, constructions, and arrangements herein described and claimed.

An object of my invention is to provide a process for plucking poultry which is adapted to remove all of the feathers from a fowl in a single operation.

A further object of my invention is to provide a process for plucking poultry which makes use of a vacuum for removing the feathers, whereby the soft points of the quills will be suddenly expanded and will be ejected from the fowl, thus removing all of the feathers from the fowl during a single operation.

A further object of my invention is to provide a process for plucking poultry which makes use of a novel means for accomplishing the steps in the process.

A further object of my invention is to provide a poultry plucking means which is adapted to suddenly withdraw the air from a chamber in which the fowl is disposed, whereby a vacuum is produced in the chamber, thus causing the soft points of the quills to be suddenly expanded so as to eject the feathers from the body of the fowl.

A further object of my invention is to provide a poultry plucking means which is simple in construction, durable and efficient for the purpose intended, and which is not likely to get out of order.

Other objects and advantages will appear in the following specification, and the novel features of the invention will be particularly pointed out in the appended claims.

My invention is illustrated in the accompanying drawings, forming part of this application, in which—

Figure 1 is a perspective view of the device,

Figure 2 is an enlarged vertical section of the plucking chamber,

Figure 3 is an enlarged sectional view of the valve communicating between the chamber and the tank, Figure 4 is a plan view of the valve machinery, Figure 5 is a side elevation of Figure 4, Figure 6 is a portion of Figure 5, parts thereof being broken away and Figure 7 is a wiring diagram of the electrical circuits employed in the device.

The vacuum tank 1 is surmounted by the air pump 2, which is adapted to keep the air exhausted from the tank during operation. A plucking chamber 3 is built upon the side of the tank. Communication between the two is obtained by means of an opening 4 that is controlled by the valve shown in Figure 3. Within the chamber 3 is a removable cage 36 of heavy wire screen, in which are hung the poultry to be plucked, and which is adapted to retain the feathers after they are removed from the fowls. This cage occupies the entire interior of the chamber except for the space 37 which is taken up by the means for controlling the valve. The entire front of the plucking chamber is enclosed by a tight-fitting door 38 in which there is a valve 39 that is operated by hand, for admitting air into the chamber to restore the normal air pressure after the fowls are plucked and before the door is opened for their removal.

The automatic valve is of unique construction and requires particular description. It is designed to be opened by touching an electric button, whereby the valve will permit the air to pass from the plucking chamber into the vacuum tank. After the valve opens, it closes and locks itself automatically.

The entire valve is built upon a removable circular plate 8 that is bolted tightly over an opening in the wall of the tank (see Figures 3 and 4). This plate has a bevelled circular opening 4 therein. The valve body 5 is also bevelled to form a tight-fitting closure for the opening. Into the back of the valve is screwed a tubular shaft 9 which has a bore 15 therein. About one-third of the outer end of this shaft has its outer surface turned down to a smaller diameter 14 than the outer diameter of the tube 9. The bore 15 is also reduced at 16. A valve stem 6 is slidably disposed in the bore 15 and extends into the smaller portion of the bore.

Mounted upon the valve stem and occupying the larger portion of the bore 15 is a compressible helical spring 18 held upon the stem by a nut 17 which seats against the shoulder formed at the junction of the bores 15 and 16. This spring is stiff enough to sustain a pressure somewhat greater than the pressure against the valve caused by the tendency of the air to pass from the plucking chamber into the tank when the tank is in vacuum, and so is able to hold the valve shut against this pressure. A small opening 41 is bored into the end of the shaft 9 to permit the exit of the air upon the insertion of the valve stem, after which it is tightly closed by a plug.

The valve is guided in its movement by two guides 7 and 10. The member 10 also acts as a stop for the forward movement of the valve. The shoulder formed by the junction of the two outer surfaces of the shaft, engage with the member 10 and thus stops any further movement of the valve in an outward direction.

The exposed end of the valve stem terminates in a loop or eye 42 for the attachment of a flexible ribbon of steel which is used to draw the valve shut and hold it shut. This ribbon is wound upon a shaft 21 extending horizontally across the valve opening in the manner and by the means now to be described.

A removable flat rectangular plate 43 is secured to the tank 1 directly over the valve opening and having another opening opposite the first. Upon each side of this plate a bearing is erected to carry the shaft 21. The steel ribbon 19 is so attached to the center of the shaft that it may be wound up in either direction and so close the valve when the shaft is rotated in either direction.

On each end of the shaft a balance wheel 23 is mounted which has reverse ratchet teeth 24 and 25 on the two sides of its rim (see Figure 6). Into each side of the plate is secured a bolt 26 which serves as a pivot for a dog 27 and a pawl 28. This dog and pawl engage each with its appropriate ratchets. Thus, each balance wheel can be locked against rotation in either direction.

Each dog and pawl has an arm 29 extending upwardly from the pivot point. Just above each pair of arms 29 is a trigger 30 capable of holding either the dog or pawl out of engagement with the ratchets. A horizontal wooden bar 31 supported by brackets 32 extends across and above the ends of the dogs and pawls. This bar carries four solenoids 33 which have their cores operatively attached each to a dog and pawl. These solenoids are wired in pairs, those operating the dogs being connected to one circuit and those operating the pawls to another circuit. Now, either the pair of dogs or the pair of pawls, when raised by their respective solenoids, will release the ratchets to which they were connected, and will be held away by the latch 30. Thus, whichever way the balance wheels are rotated, the ratchets are sliding under either dogs or pawls, which lock them wherever they stop and thus prevent the unwinding of the ribbon 19.

From the foregoing description of the various parts of the device, the operation thereof may be readily understood. The fowls are placed within the cage 36 and the cage inserted within the chamber 3. The door 38 is closed. Assume that the strip 19 is wound around the shaft 21 in such a manner that the wheels 23 will have to rotate in the direction of the arrow in Figure 5 so as to unwind the strip from the shaft 21. The operation of raising the dogs raises the triggers, and thereby releases the pawls previously held out of operation. Likewise the catching and latching of the pawls releases the dogs. Thus the pawls and dogs alternate automatically in operation.

This operation takes place as soon as a push button (see Figure 7) is pressed so as to cause an electric current to flow through the solenoids 33 which are connected to the dogs 28. The dogs 28 are pulled out of engagement with the ratchets 25 of the wheels 23 when the solenoids of the dogs are energized.

It will be noted from Figure 5 that as soon as the dogs are swung out of engagement with the ratchets 25, they will be held in this position by means of the triggers 30.

The spring 18 is under tension when the valve is closed and starts to unwind the strip 19 as soon as the dogs 28 have been released. It should also be noted that the chamber 3 is under normal air pressure and the air therein is trying to gain entrance into the vacuum tank 1. It will therefore be noted that when the wheels 23 are released so as to permit the valve 5 to open, the air rushing from the chamber 3 into the tank 1 will tend to open the valve, and to increase the speed of the wheels 23.

When the valve 5 is entirely opened, the pressures within the tank 1 and the chamber 3 are the same, and it will therefore be apparent that the valve 5 may be readily closed. When the valve 5 is in opened position, the entire length of strip 19 is fed from the shaft 21. Further rotation of the wheels 23 will again wind the strip 19 upon the shaft 21 in the reverse direction. The wheels will rotate until the valve 5 is closed and then will continue to rotate so as to compress the spring 18. The compression of the spring 18 will quickly bring the wheels 23 to a stop. As soon as the wheels are brought to a stop, the spring 18 will again tend to rotate the wheels in the reverse direction.

This movement is prevented by means of the pawls 27 which immediately engage with the ratchets 24. It should be noted that a rotation of the wheel 23 in the direction of the arrow will not be prevented by the pawls 27, since the pawls will ride over the teeth of the ratchet 24.

During the opening and the closing of the valve 5, the chamber 3 has been placed under vacuum. The soft points of the quills will be suddenly expanded and will therefore cause the quills to be ejected from the body of the fowl. The cage 36 will hold all of the feathers. The operator now allows air to enter the chamber 3 through the valve 39 so as to place the chamber under normal air pressure. The door 38 is opened and the cage 36 is removed from the chamber 3 so as to permit the fowls to be removed from the cage. The cage is filled with another batch of fowls and is again inserted into the chamber 3.

It will be noted that the dogs 28 are still held out of engagement with the ratchets 25 by the triggers 30. The tape 19 is now wound around the shaft 21 in such a manner that the wheels 23 will have to rotate in a direction reverse to that shown by the arrow in Figure 5 so as to permit the valve 5 to open. It will therefore be apparent that the pawls 27 will have to be removed from the ratchets 24 so as to permit the wheels to rotate in the reverse direction to that shown by the arrow.

To effect this result, a push button (see Figure 7) is pressed so as to close an electrical circuit through the solenoids 33 which are operatively connected to the pawls 27. The pawls 27 are removed from the ratchets 24 and are held in this position by means of the trigger 30.

It will be seen from the foregoing that the chamber 3 can have the air therein exhausted any number of times by merely pressing the push buttons which are in electrical connection with the solenoids that are operatively connected to the pawls 27 of the dogs 28.

The spring 18 is strong enough to keep the valve 5 seated when the chamber 3 is under normal air pressure and the tank 1 under a vacuum. The mechanism for opening and closing the valve 5 each time one of the push buttons is pressed, is simple in construction and provides a novel means for instantly placing the chamber 3 under vacuum. It is the suddenness with which the air is exhausted from the chamber 3 that accomplishes the plucking of the poultry.

I claim:

1. A device of the type described comprising a chamber adapted to receive fowls, means for exhausting the air from said chamber, said means consisting of a vacuum tank in communication with said chamber, a valve for controlling the passage of air from the chamber into the tank, and an electrically operated trip adapted to control the operation of said valve, said valve being adapted to close automatically after the air has passed from the chamber into the tank.

2. The herein described steps in a process which consists in putting a fowl in a chamber and suddenly placing the chamber under vacuum, whereby the feathers of the fowl will be expanded, and the portions of the feathers disposed in the body of the fowl will be forcibly ejected therefrom.

3. A device of the type described comprising a chamber adapted to receive fowls, means for exhausting the air from said chamber, whereby the quills of the feathers of the fowl may be expanded and will be forcibly ejected from the body of the fowl, said means comprising a vacuum tank in communication with said chamber, and a valve for controlling the passage of air from the chamber into the tank.

4. A device of the type described comprising a chamber adapted to receive fowls, means for exhausting the air from said chamber, whereby the quills of the feathers of the fowl may be expanded and will be forcibly ejected from the body of the fowl, said means comprising a vacuum tank in communcation with said chamber, a valve for controlling the passage of air from the chamber into the tank, said valve being adapted to be electrically opened and automatically closed.

5. The herein described process for plucking poultry which consists in putting a fowl in a chamber and suddenly placing the chamber under vacuum.

6. A device of the type described comprising a chamber adapted to receive fowls therein, a vacuum tank in communication with said chamber, a valve for controlling the passage of air from the chamber to the tank, means for opening and closing said valve and for locking said valve in closed position, said locking means being electrically controlled.

7. In a device of the type described, a valve, a shaft, a fly wheel rigidly secured to said shaft, and a tape adapted to be wound upon said shaft when said shaft is rotated in either direction, the free end of said tape being secured to said valve, said tape being adapted to close said valve when wound upon said shaft.

8. In a device of the type described, a valve, a shaft, a fly wheel rigidly secured to said shaft, and a tape adapted to be wound upon said shaft when said shaft is rotated in either direction, the free end of said tape being secured to said valve, said tape being adapted to close said valve when wound upon said shaft, and electrically controlled locking dogs for said wheel and being adapted to prevent the rotation of said wheel in either direction.

9. In a device of the type described, a valve, a shaft, a fly wheel rigidly secured to said shaft, and a tape adapted to be wound upon said shaft when said shaft is rotated in either direction, the free end of said tape being secured to said valve, said tape being adapted to close said valve when wound upon said shaft, electrically controlled locking dogs for said wheel and being adapted to prevent the rotation of said wheel in either direction, and a spring for starting said fly wheel to rotate when said fly wheel is released fom said dogs.

10. In a device of the type described, a chamber adapted to receive fowls therein, a vacuum tank in communication with said chamber, a valve for controlling the passage of air from the chamber to said tank, a shaft rotatably carried by said tank, a fly wheel rigidly secured to said shaft, and a tape adapted to be wound upon said shaft for closing said valve, the free end of said tape being secured to said valve.

11. In a device of the type described, a chamber adapted to receive fowls therein, a vacuum tank in communication with said chamber, a valve for controlling the passage of air from the chamber to said tank, a shaft rotatably carried by said tank, a fly wheel rigidly secured to said shaft, a tape adapted to be wound upon said shaft for closing said valve, the free end of said tape being secured to said valve, and electrically controlled locking dogs adapted to prevent the rotation of said fly wheel in either direction.

12. In a device of the type described, a chamber adapted to receive fowls therein, a vacuum tank in communication with said chamber, a valve for controlling the passage of air from the chamber to said tank, a shaft rotatably carried by said tank, a fly wheel rigidly secured to said shaft, a tape adapted to be wound upon said shaft for closing said valve, the free end of said tape being secured to said valve, and spring means for starting said fly wheel to rotate when said fly wheel is freed from said locking dogs.

GEORGE W. ATKINSON.